(12) United States Patent
Christenson

(10) Patent No.: US 8,972,547 B2
(45) Date of Patent: Mar. 3, 2015

(54) METHOD AND APPARATUS FOR DYNAMICALLY CONFIGURING VIRTUAL INTERNET PROTOCOL ADDRESSES

(75) Inventor: David Alan Christenson, Fergus Falls, MN (US)

(73) Assignee: International Business Machines Corporation, Armonk, NY (US)

(*) Notice: Subject to any disclaimer, the term of this patent is extended or adjusted under 35 U.S.C. 154(b) by 2102 days.

(21) Appl. No.: 11/874,264

(22) Filed: Oct. 18, 2007

(65) Prior Publication Data

US 2009/0106404 A1    Apr. 23, 2009

(51) Int. Cl.
G06F 15/177 (2006.01)
H04W 40/00 (2009.01)
H04L 12/66 (2006.01)
H04L 29/12 (2006.01)
H04L 12/26 (2006.01)

(52) U.S. Cl.
CPC ...... H04L 61/2015 (2013.01); H04L 29/12952 (2013.01); H04L 61/6077 (2013.01); *H04L 43/0811* (2013.01); *H04W 40/00* (2013.01)
USPC ............................. 709/222; 455/445; 370/463

(58) Field of Classification Search
CPC . H04L 12/2807; H04L 41/20; H04L 43/0811; H04L 12/66; H04L 29/12216; H04L 12/4641; H04L 61/2007; H04L 29/1233; H04L 29/1282
USPC ................................................. 709/223, 222
See application file for complete search history.

(56) References Cited

U.S. PATENT DOCUMENTS

| | | | | |
|---|---|---|---|---|
| 5,379,417 A * | 1/1995 | Lui et al. | | 713/300 |
| 5,586,121 A * | 12/1996 | Moura et al. | | 370/404 |
| 6,101,543 A * | 8/2000 | Alden et al. | | 709/229 |
| 6,330,615 B1 * | 12/2001 | Gioquindo et al. | | 709/236 |
| 6,606,690 B2 * | 8/2003 | Padovano | | 711/148 |
| 6,657,991 B1 | 12/2003 | Akgun et al. | | |
| 6,675,206 B1 | 1/2004 | Britton et al. | | |
| 6,681,258 B1 * | 1/2004 | Ratcliff et al. | | 709/245 |
| 6,697,326 B1 * | 2/2004 | Britton et al. | | 370/218 |
| 7,046,666 B1 | 5/2006 | Bollay et al. | | |
| 7,099,957 B2 * | 8/2006 | Cheline et al. | | 709/245 |
| 7,197,550 B2 * | 3/2007 | Cheline et al. | | 709/223 |
| 7,496,652 B2 * | 2/2009 | Pezzutti | | 709/223 |
| 7,533,194 B2 * | 5/2009 | Koertel | | 710/8 |
| 2002/0032780 A1 | 3/2002 | Moore et al. | | |
| 2004/0052216 A1 | 3/2004 | Roh | | |
| 2004/0122651 A1 * | 6/2004 | Herle | | 703/27 |
| 2005/0044196 A1 * | 2/2005 | Pullen et al. | | 709/223 |
| 2005/0050179 A1 * | 3/2005 | Diehl et al. | | 709/221 |
| 2006/0129702 A1 * | 6/2006 | Koertel | | 710/14 |

(Continued)

Primary Examiner — Arvin Eskandarnia
Assistant Examiner — Margishi Desai
(74) Attorney, Agent, or Firm — Roy W. Truelson

(57) ABSTRACT

A host node connected to a network using an Internet Protocol automatically identifies multiple adapters connected to the same network, preferably by broadcasting a Dynamic Host Configuration Protocol (DHCP) request for assignment of an IP address on a first adapter, and listening to the request on a second adapter, thereby determining that both adapters are on the same network. The host preferably causes an IP address to be generated for one of the adapters, and automatically configures the adapters to share the IP address thus generated as a virtual IP address, assigning one of the adapters as a primary adapter. Preferably, the host automatically detects deactivation of the primary adapter and switches the virtual address assignment to a different adapter.

8 Claims, 10 Drawing Sheets

(56) References Cited

U.S. PATENT DOCUMENTS

| | | |
|---|---|---|
| 2006/0209795 A1* | 9/2006 | Chow et al. .................... 370/352 |
| 2006/0271707 A1* | 11/2006 | Cheline et al. ................ 709/245 |
| 2007/0025253 A1* | 2/2007 | Enstone et al. ................ 370/235 |
| 2008/0109539 A1* | 5/2008 | Foster et al. .................. 709/221 |
| 2008/0133854 A1* | 6/2008 | Fukuguchi .................... 711/161 |
| 2008/0137590 A1* | 6/2008 | Stott et al. ..................... 370/328 |

* cited by examiner

METHOD AND APPARATUS FOR DYNAMICALLY CONFIGURING VIRTUAL INTERNET PROTOCOL ADDRESSES

FIELD OF THE INVENTION

The present invention relates to the use of the Internet, and in particular, to the use of virtual Internet Protocol (IP) addresses on the Internet.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users. At the same time, the cost of computing resources has consistently declined, so that information which was too expensive to gather, store and process a few years ago, is now economically feasible to manipulate via computer. The reduced cost of information processing drives increasing productivity in a snowballing effect, because product designs, manufacturing processes, resource scheduling, administrative chores, and many other factors, are made more efficient.

The reduced cost of computing and the general availability of digital devices has brought an explosion in the volume of information stored in such devices. With so much information stored in digital form, it is naturally desirable to obtain wide access from computer systems. The volume of information dwarfs the storage capability of any one device. To improve information access, various techniques for allowing computing devices to communicate and exchange information with one another have been developed. Perhaps the most outstanding example of this distributed computing is the World Wide Web (often known simply as the "web"), a collection of resources which are made available throughout the world using the Internet. People from schoolchildren to the elderly are learning to use the web, and finding an almost endless variety of information from the convenience of their homes or places of work. Businesses, government, organizations and even ordinary individuals are making information available on the web, to the degree that it is now the expectation that anything worth knowing about is available somewhere on the web.

The Internet, which provides the support for the web as well as for e-mail and other forms of communication and distributed processing among multiple digital systems, is a heterogeneous network of digital devices (nodes) connected by multiple links, so that between any two nodes of the network there are typically multiple paths, giving the Internet some degree of redundancy.

In order to support communication between any two arbitrary nodes coupled to the Internet, a global naming convention known as the Domain Name System (DNS) is used to assign a unique name to each node. A source node connected to the Internet, having only the global DNS name of a target node, can send a data packet to the target, allowing the various routers, servers and other devices on the Internet to determine a path and final destination node for the data packet. As part of this routing process, the global DNS name is translated to an Internet Protocol (IP) address of the target node which is used at the communications link level. Name-to-address translation is accomplished by one or more domain name servers connected to the Internet.

As the Internet has evolved, the task of maintaining the databases in the domain name servers has accordingly grown in scope and complexity. Originally, it was anticipated that the domain server databases would be relatively static databases maintained by manual editing. The massive increase in number of nodes and uses to which they are put has induced changes to the underlying Internet protocols. The most recent protocol, Internet Protocol Version 6 (IPv6), supports dynamic assignment of IP addresses to physical devices and IP addresses which have limited lifetimes, expiring by their own terms at the end of the defined lifetime. With these and other changes, it is expected that the number of IP addresses per node may increase dramatically, and that the set of current valid addresses may be subject to frequent change. The burden of maintaining IP addresses is accordingly increased.

In some circumstances, it is possible for multiple physical network adapters coupled to a common node to share the same IP address. Such a shared address is also referred to as a virtual IP address. The use of virtual IP addresses provides a degree of fault tolerance, since if one adapter fails, another adapter sharing the same virtual IP address can receive incoming network communications addressed to the virtual address. Unfortunately, current techniques for automatically configuring an IP address to a physical device generally do not work well with virtual IP addresses. Using prior art techniques, it is generally necessary to manually configure the virtual IP address.

Manual configuration is cumbersome and error prone. Furthermore, manual reconfiguration may be required every time an adapter is added, removed, or plugged into a different physical network. The advent of IPv6 and the continued growth and maturation of the Internet is likely to overwhelm conventional processes for maintaining Internet address data, and in particular for configuring virtual IP addresses. A need therefore exists for improved techniques for configuring IP addresses, and in particular, for configuring virtual IP addresses.

SUMMARY OF THE INVENTION

In a first aspect of the present invention, a host node connected to a network using an Internet Protocol automatically identifies multiple adapters connected to the same local network, causes an IP address to be generated for one of the adapters, and automatically configures the adapters to share the IP address thus generated as a virtual IP address.

In a second aspect of the present invention, a host node connected to a network using an Internet Protocol automatically identifies multiple adapters connected to the same local network by broadcasting a request for assignment of an IP address on a first adapter, and listening to the broadcast request on a second adapter, thereby determining that both adapters are on the same network.

In the preferred embodiment, the host node uses the Dynamic Host Configuration Protocol (DHCP) to dynamically assign an IP address to one of its adapters. This is accomplished by broadcasting a DHCPREQUEST message on the adapter's local network. All adapters on the local network receive the broadcast DHCPREQUEST message, including in particular any other adapters in the same host which are connected to the local network. If another adapter in the same host receives the DHCPREQUEST message, the host determines that the other adapter is connected to the same local network. In this instance, the host configures an IP address assigned by a DHCP server as a virtual IP address shared by all adapters on the same local network. One of the adapters (preferably the one through which the DHCPREQUEST was initiated) is designated as the virtual IP address owner, and receives incoming traffic and responds to Address Resolution Protocol (ARP) requests on behalf of the virtual IP address. The other adapter or adapters on the same network are standby adapters, and may assume ownership of the virtual IP address if the designated owner ceases to function.

In the preferred embodiment, one of the adapters sharing a virtual IP address is designated the primary adapter, and responds to communications addressed to the virtual IP address. The host automatically responds to deactivation of the primary adapter by assigning the virtual IP address to another adapter sharing the same network. In the DHCP protocol, this means that the host transmits an ARP advertisement over the network to inform other network devices that the virtual IP address is now associated with a different device.

Providing a means for automatically detecting multiple host adapters coupled to the same network and automatically configuring a virtual IP address makes virtual IP addresses significantly easier to use and maintain, reducing the amount of manual intervention and errors which can result therefrom. This advantage becomes more pronounced when using temporary IP addresses in accordance with more modern protocols. At the same time, the techniques described herein are compatible with existing Internet protocols. By making virtual addresses easier to use and maintain, the use of such addresses is further encouraged, thereby resulting in more robust network connection The details of the present invention, both as to its structure and operation, can best be understood in reference to the accompanying drawings, in which like reference numerals refer to like parts, and in which:

DETAILED DESCRIPTION OF THE PREFERRED EMBODIMENT

Overview

Prior to discussing the operation of embodiments of the invention, a brief overview discussion of the Internet is provided herein.

The term "Internet" is a shortened version of "Internetwork", and refers commonly to a collection of computer networks that utilize the packet-based TCP/IP suite of protocols, well-known in the art of computer networking. TCP/IP is an acronym for "Transport Control Protocol/Internet Protocol", a software protocol that facilitates communications between computers.

Figure 1:
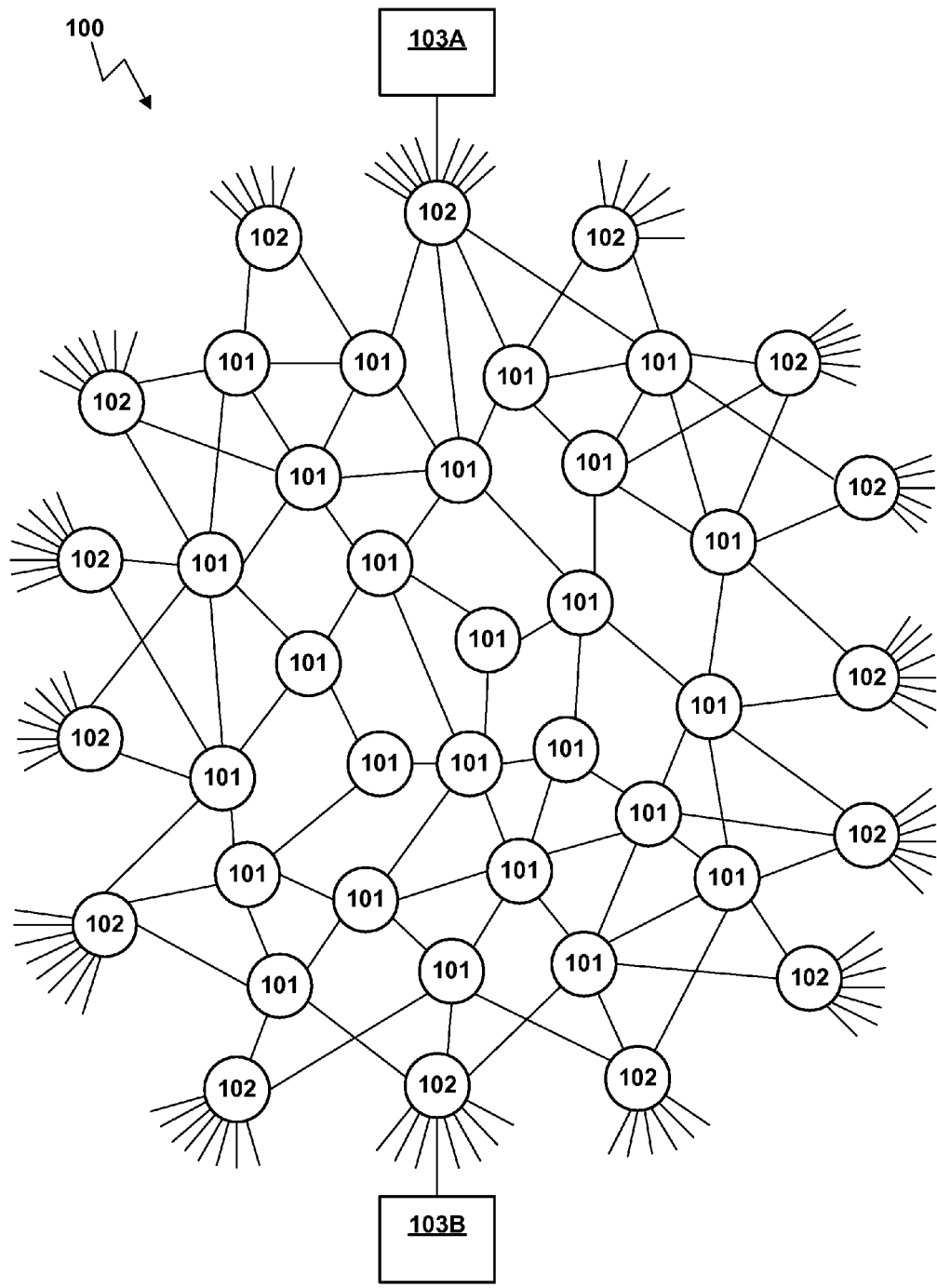
FIG. 1 is a high-level conceptual view of the Internet

FIG. 1 is a high-level conceptual view of the Internet. The Internet has no pre-established topology, and is indefinitely extensible by adding new nodes and links. A node may have any number of links connecting it to other nodes, and these may use any of various communications technologies, having different data capacities and other characteristics. The topology of the Internet therefore becomes an extremely complex interconnected network, in which there are typically a large number of possible pathways between any two nodes.

The central part of the network, sometimes called the "backbone", contains multiple high-speed routers 101 which receive data packets and forward these on to other nodes in the network. Typically, each router has multiple connections to other routers, and these connections have a high data capacity. For example, fiber optic links are often used between high-speed routers 101. Connected to the high-speed routers are nodes which serve as access points to the Internet "backbone" of high-speed routers, illustrated in FIG. 1 as nodes 102. Access nodes 102 are also routers since they function to route data packets between the high-speed routers 101 and other network nodes, but they typically employ lower-speed connections. An access node may be, for example, a public Internet Service Provider which provides access to the Internet through telephone lines, cable TV, or other connections for a fee, or may be an access node of an enterprise which is coupled to an internal local area network (LAN) for the enterprise's internal systems. Usually, each access node 102 connects to multiple high-speed routers 101 to provide redundancy, although this is not a requirement. Each access node typically provides access to multiple host computer systems 103A, 103B (referred to generically as reference numeral 103), of which only two are illustrated in FIG. 1.

Hosts 103 are the computer systems which connect to the Internet and which generate as the source or receive as the ultimate destination the data packets transmitted over the Internet. Hosts 103 may be any type of computer system, from large mainframe systems to PCs to handheld portable devices. Often, a host has only one access node 102 which it uses to access the Internet (in which case it is non-redundant), although it may have multiple such access nodes for redundancy. The connection between the host and the access node is often relatively low speed (such as a telephone line or radio frequency link), but could be a high-speed link. In the case of some computer systems, such as large Internet servers which function primarily to provide information over the Internet, the host may be connected directly to high-speed routers 101 and therefore serve as its own access node.

It will be understood that FIG. 1 is intended as a conceptual illustration of the Internet, and that in reality the number of nodes and connections on the Internet is vastly larger than illustrated in FIG. 1, and that the topology of the connections may vary. Furthermore, it will be understood that there may be further hierarchies of types of connections and forms of access, which are not shown in FIG. 1 for clarity of illustration. I.e., there may be multiple types or classes of access node 102 through which a host connects to reach the high-speed routers 101 of the backbone, and that different hosts may connect at different levels of access node. Strictly speaking, the Internet comprises all devices coupled to it, and when a small computer system such as a PC is logged on to the Internet, it is part of the Internet in the sense that it becomes an Internet node and has an address (although the address may be only temporary). Often, the routers and connections of the Internet backbone and access nodes are referred to as the Internet, i.e., the Internet is viewed as a communications medium as opposed to a distributed processing network of computer systems. Depending on the context, either usage may be employed.

In order to enable communication of data in any network from one arbitrary node to another, the sending node must specify the destination of the receiving node. For very small networks, such as a local area Ethernet network, it is possible to broadcast data to all nodes in the network, identifying the desired recipient with a simple addressing scheme. The size of the Internet makes such an approach impractical. It is still necessary for the sender to specify a destination, but it is not practical to transmit the data to every node in the network until the destination is found. This means that the sender, and every node in between the sender and recipient in the pathway, must be able to make a determination where to route the data so that it reaches its destination. Generally, there will be multiple possible routes and a router may decide which to use based on various factors.

At the level of the router hardware, an Internet destination node is specified by a multi-bit numerical address, called an Internet Protocol (IP) address. The original Internet addressing system used a 32-bit IP address divided into four parts or "octets" of 8 bits each. These octets are often written separated by periods, e.g., an IP address might be written as: 90.4.63.18. This is the format employed by Internet Protocol Version 4 (IPv4), in general use on the Internet today. The octets are a hierarchical form of addressing, and it is not necessary for any single router to know the ultimate destination of all Internet addresses. A data packet bearing a distant address will be routed to a router which is closer and therefore able to further refine the address, and so on until the data packet reaches its ultimate destination.

Although the original 32-bit address was initially adequate, in recent years the Internet address space has become constrained. One response has been to adopt a new standard for Internet IP addresses, known as Internet Protocol Version 6 (IPv6). IPv6 supports IP addresses of 128 bits. IPv6 is currently being phased in, and many Internet devices still use the older IPv4 32-bit addressing protocol.

Where an IP address specifies a node connected to a local area network (LAN), some or all of the IP address typically specifies the access point of the LAN. Another portion of the IP address may specify a node within the LAN. Since the Internet address space is becoming constrained, another response to the shortage of IPv4 addresses has been to share IP addresses on the LAN. This can be done by dynamically recycling a smaller number of IP addresses among a larger number of devices on the LAN. Alternatively, a "port" designation, in addition to the IP address, can be used for specifying a node within the access point (LAN). I.e., the IP address can be used to specify the Internet access point of the LAN, and the port to specify a node within the LAN which is connected to the Internet at that access point. The Internet access point translates the IP address (and port, if included) of a packet received over the Internet to a local network address, which may also be an IP address. When configured in this manner, the IP address used by the Internet "backbone" routers is referred to as a global IP address, and the IP address used within the LAN is a LAN-local or local IP address.

As used in the present application and unless otherwise qualified, an "Internet Protocol address" or "IP address" includes an address compliant with IPv4, or with IPv6, or any subsequent version or modification thereof, and may be any of a global IP address or a local IP address.

An IP address allows a sending node to route a data packet to a receiving node, but there would be drawbacks to using a numerical IP address for higher-level interprocess communications using the Internet. For one thing, numerical addresses are hard for people to remember. Additionally, some IP addresses might be shared among multiple nodes, or might change due to changes in network configuration. For these and other reasons, a higher level naming convention for Internet nodes exists, which is called the Domain Name System (DNS). Internet nodes are given names in the DNS having arbitrary alphabetic characters, which are then translated to IP addresses. The DNS name of a node can thus be made easier to remember, and need not change simply because some hardware has changed. For example, a person can establish a web server having a familiar DNS name which clients are likely to remember, and can maintain the same DNS name even if the actual IP address of the web server changes due to hardware upgrades and so forth.

Due to the size and dynamic nature of the Internet, it is almost impossible to maintain a single large record of all DNS names and their corresponding IP addresses. The Internet's DNS therefore employs a distributed form of address record keeping, in which DNS names are hierarchical. A DNS name comprises multiple text character portions, each separated by a period, the portions representing a naming hierarchy, proceeding left to right from most specific to most general. When a source node, such as a PC executing an Internet browser application, attempts to send data to a user-specified domain name, one or more domain name servers are invoked to translate this domain name to an IP address, and the IP address is then used to route the data packet through the Internet's routers to its destination.

A name is resolved to an IP address in a hierarchical fashion, which may take multiple steps. The sender first accesses its own DNS name server to request a translation of the name (each node must at the very least have the IP address for its name server, and therefore this server is always available without the need to translate an address). If we assume that a name will be translated from scratch, the name server first accesses a DNS server for the root part of the destination name. This DNS server should be able to identify the next level of the name, and so on. The number of steps may vary, since the number of name portions may vary, and the DNS database for any part of the name may itself be maintained on hierarchical servers. In reality, most DNS servers cache a large number of names and IP addresses, so it is not always necessary to follow all the translation steps described above from the root DNS server on down.

For any given node, there is always at least one DNS server which maintains domain names and addresses at the lowest level of the hierarchy. When this DNS server is reached during a traversal of the various DNS servers which maintain portions of a name, the IP address with that name can be obtained. The set of nodes for which such a low level DNS server maintains names and IP addresses is called the zone of the server. Typically, there will be multiple DNS servers for each zone which synchronize their records in some fashion, e.g., one server maintains a master copy of the domain name database, while others have shadow copies of the database. The use of multiple DNS servers provides redundancy as well as the additional processing power of the multiple servers.

DETAILED DESCRIPTION

Figure 2:
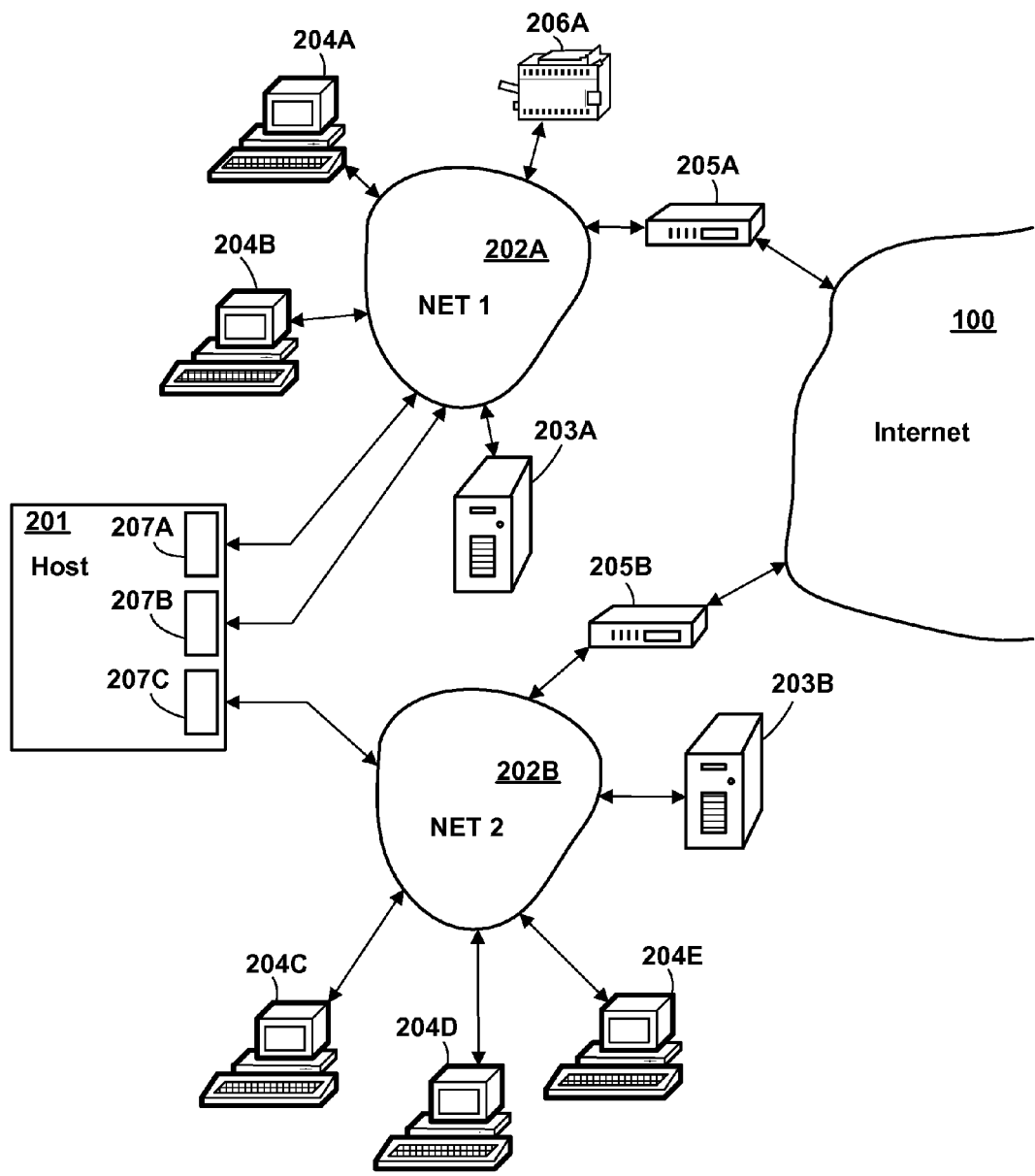
FIG. 2 is a high-level illustration of the major components of an Internet environment for maintaining IP addresses, in accordance with the preferred embodiment.

Referring to the Drawing, wherein like numbers denote like parts throughout the several views, FIG. 2 is a high-level illustration of an Internet environment, showing some of the major components involved in a system which automatically maintains certain IP addresses including virtual IP addresses, in accordance with the preferred embodiment of the present invention. As shown in FIG. 2, a host node 201 is coupled to one or more networks, of which two networks 202A, 202B (generically referred to herein as feature 202) are shown in the exemplary embodiment of FIG. 2, it being understood that the number could vary. At least one Dynamic Host Configuration Protocol (DHCP) server is coupled to at least one of the networks 202. FIG. 2 represents DHCP servers 203A, 203B (generically referred to herein as feature 203) coupled to respective networks 202A, 202B. Each network 202A, 202B is coupled to the Internet via a respective router 205A, 205B (generically referred to herein as feature 205), the router serving as an access node for all devices on its respective network to access the Internet. Any of various additional devices may be connected to networks 202, such as workstations 204A-204E and printer 206.

For clarity of description herein, host node 201 is referred to as the host. However, it should be understood that devices 203, 205 and 206 are also hosts, and may send and/or receive communications over their respective networks, including communications to or from other devices (not show) attached via the Internet. Host node 201 could be any digital data device (other than a router) which either sends or receives communications, from large mainframe computer systems to small portable devices such as personal digital assistants (PDAs) and laptops. While it is preferably a general purpose computer system, it could alternatively be a special purpose device or component of a distributed processing system, such as a storage device array, a printer, a specialized server, etc.

Host 201 contains a plurality of network adapters for coupling to the networks, of which three adapters 207A-207C (generically referred to herein as feature 207) are illustrated in FIG. 2. As shown, adapters 207A and 207B are coupled to network 202A, while adapter 207C is coupled to network 202B. Adapters 207A and 207B thus can provide a redundant connection to network 202A. It will be understood that the number of such adapters may vary.

Networks 202 may comprise any communications medium which allows host 201 to communicate with other devices, particularly DHCP server 203. For example, a network 202 might be an Ethernet or a Token Ring local area network, as might typically be the case in a business enterprise having multiple internal nodes which communicate with each other, and which have an external connection through one or more routers 205 to the Internet. Although networks 202 are described in the exemplary embodiment herein as local area networks, they are not necessarily local area networks, and could take some other form. For example, a network could be the telephone system, or a radio frequency transmission medium, or any of various other communications media. Additionally, although for simplicity a single router 205 is shown coupling each network 202 to the Internet, multiple redundant routers may couple each network 202 to the Internet, as is well known. Alternatively, routers may couple networks 202 to each other or to other networks, which are directly or indirectly connected to the Internet. Finally, although it is preferred that networks 202 be coupled directly or indirectly to the Internet to provide an Internet connection to host 201, the present invention is not limited to use on networks coupled to the Internet.

DHCP servers 203 are preferably general-purpose computer systems which are suitably programmed to maintain IP address data for the corresponding network 202 and respond to requests according to the DHCP protocol. DHCP is a known protocol, by which a device attached to a network may request assignment of an IP Address from a DHCP server having that responsibility, the DHCP server automatically providing the IP Address and updating its database to reflect the new address assignment. Although in the preferred embodiment the DHCP Protocol is used, any successor or substitute protocol or technique could alternatively be used.

Although a pair of networks, each having a single DHCP server 203, a single router 205, and several workstations and other devices, are shown in the simplified illustration of FIG. 2, it will be understood that the actual number and type of such components may vary. As explained previously, there will frequently be multiple redundant routers. Additionally, it would alternatively be possible for a single DHCP server to be coupled to multiple networks and/or for a single network to have multiple DHCP servers. The number of devices attached to each network 202 may vary, and is typically larger than illustrated.

Figure 3:
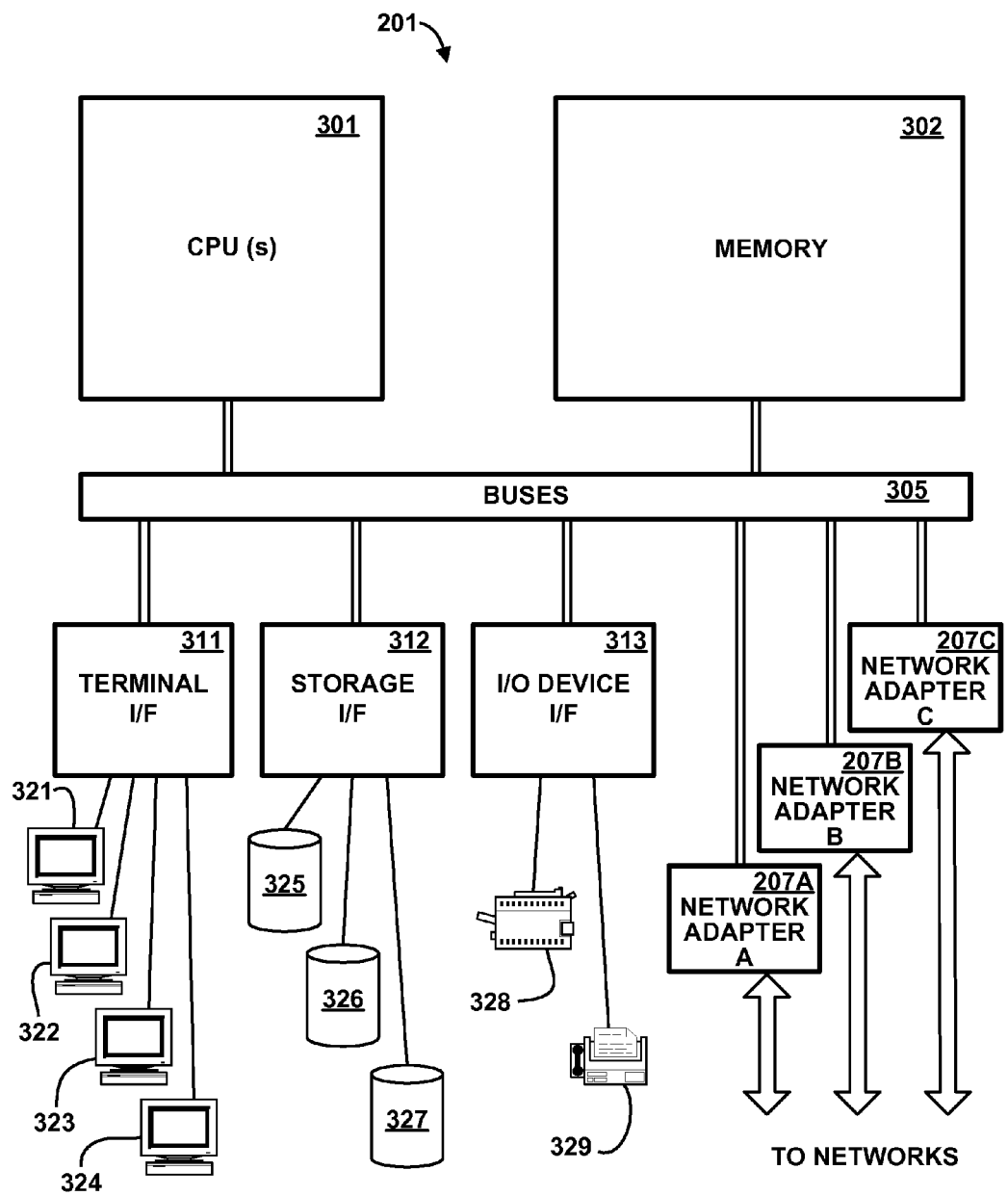
FIG. 3 shows a high-level block diagram of the major hardware components of an exemplary host node, according to the preferred embodiment.

Host node 201 is preferably a general purpose computer system which executes one or more applications which communicate with other computer systems coupled to networks 202 and/or the Internet. FIG. 3 shows a high-level block diagram of the major hardware components of an exemplary host node computer system 201, according to the preferred embodiment. CPU 301 is at least one general-purpose programmable processor which executes instructions and processes data from main memory 302. Main memory 302 is preferably a random access memory using any of various memory technologies, in which data is loaded from storage or otherwise for processing by CPU 301.

One or more communications buses 305 provide a data communication path for transferring data among CPU 301, main memory 302 and various I/O interface units, which may also be known as I/O processors (IOPs) or I/O adapters (IOAs). The I/O interface units support communication with a variety of storage and I/O devices, and include in particular interface units 311-313 and network adapters 207A-C. For example, terminal interface unit 311 supports the attachment of one or more user terminals 321-324. Storage interface unit 312 supports the attachment of one or more direct access storage devices (DASD) 325-327 (which are typically rotating magnetic disk drive storage devices, although they could alternatively be other devices, including arrays of disk drives configured to appear as a single large storage device to a host). I/O device interface unit 313 supports the attachment of any of various other types of I/O devices, such as printer 328 and fax machine 329, it being understood that other or additional types of I/O devices could be used.

Network interfaces ("network adapters") 207A-C supports a connection to one or more external networks 202 for communication with one or more other digital devices. As explained previously, networks 202 are preferably local area networks coupled to the Internet, although other configurations are possible. The host computer system 201 of the preferred embodiment contains at least two network adapters 207, three being illustrated in the exemplary embodiment of FIG. 3. It will be understood that the number of such network adapters may vary.

It should be understood that FIG. 3 is intended to depict the representative major components of host system 201 at a high level, that individual components may have greater complexity than represented in FIG. 3, that components other than or in addition to those shown in FIG. 3 may be present, and that the number, type and configuration of such components may vary, and that a large computer system will typically have more components than represented in FIG. 3. Several particular examples of such additional complexity or additional variations are disclosed herein, it being understood that these are by way of example only and are not necessarily the only such variations.

Although only a single CPU 301 is shown for illustrative purposes in FIG. 3, host system 201 may contain multiple CPUs, as is known in the art. Although main memory 302 is shown in FIG. 3 as a single monolithic entity, memory 302 may in fact be distributed and/or hierarchical, as is known in the art. E.g., memory may exist in multiple levels of caches, and these caches may be further divided by function, so that one cache holds instructions while another holds non-instruction data which is used by the processor or processors. Memory may further be distributed and associated with different CPUs or sets of CPUs, as is known in any of various so-called non-uniform memory access (NUMA) computer architectures. Although communications buses 305 are shown in FIG. 3 as a single entity, in fact communications among various system components is typically accomplished through a complex hierarchy of buses, interfaces, and so forth, in which higher-speed paths are used for communications between CPU 301 and memory 302, and lower speed paths are used for communications with I/O interface units 311-313 and 207A-C. Buses 305 may be arranged in any of various forms, such as point-to-point links in hierarchical, star or web configurations, multiple hierarchical buses, parallel and redundant paths, etc. For example, as is known in a NUMA architecture, communications paths are arranged on a nodal basis. Buses may use, e.g., an industry standard PCI bus, or any other appropriate bus technology. While multiple I/O interface units are shown which separate system buses 305 from various communications paths running to the various I/O devices, it would alternatively be possible to connect some or all of the I/O devices directly to one or more system buses.

Host system 201 depicted in FIG. 3 has multiple attached terminals 321-324, such as might be typical of a multi-user "mainframe" computer system. The actual number of attached devices may vary, and the present invention is not limited to systems of any particular size. Host system 201 might alternatively be a single-user system such as "personal computer". User workstations or terminals which access host system 201 might also be attached to and communicate with system 201 over any of networks 202. Host system 201 may alternatively be a system containing no attached terminals or only a single operator's console containing only a single user display and keyboard input. Furthermore, while certain functions of the invention herein are described for illustrative purposes as embodied in a single computer system, these functions could alternatively be implemented using a distributed network of computer systems in communication with one another, in which different functions or steps described herein are performed on different computer systems. Finally, it will be understood that a host node in accordance with the present invention need not be a computer system at all, but can be any of various special purpose digital devices which communicate over one or more networks.

While various system components have been described and shown at a high level, it should be understood that a typical computer system contains many other components not shown, which are not essential to an understanding of the present invention. In the preferred embodiment, host system 201 is a computer system based on the IBM i/Series™ architecture, it being understood that the present invention could be implemented on other computer systems.

Figure 4:
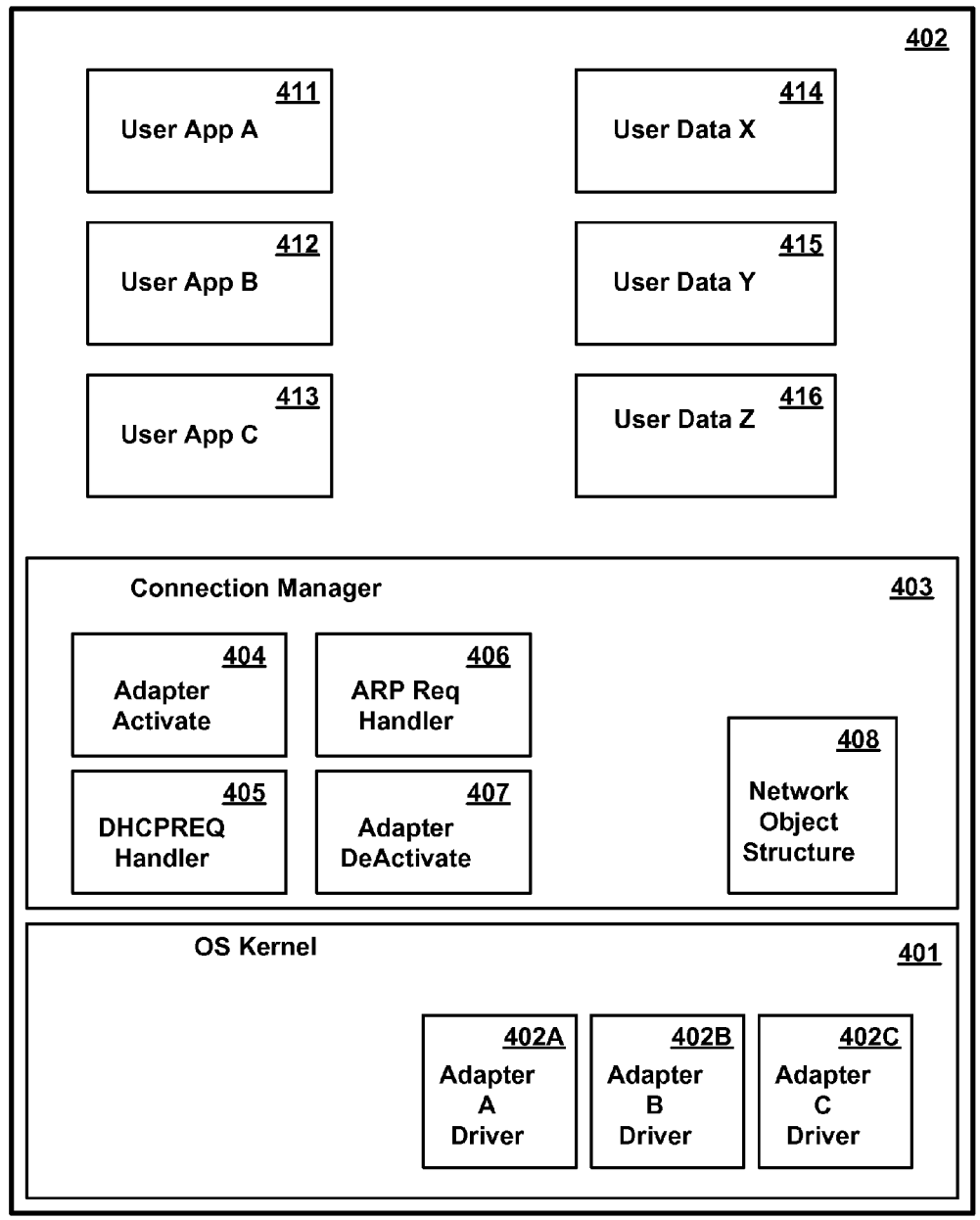
FIG. 4 is a conceptual illustration of the major software components of a host computer system, according to the preferred embodiment.

FIG. 4 is a conceptual illustration of the major software components of host computer system 201, represented as components of memory 302, according to the preferred embodiment. Operating system kernel 401 is executable code and state data providing various low-level software functions, such as device interfaces, mapping and management of memory pages, management and dispatching of multiple tasks, security and data integrity, error recovery, etc. as is well-known in the art. In particular, OS kernel 401 includes a respective network adapter device driver instance 402A-C for each network adapter 207A-C of host system 201. Each adapter driver instance is executable code and state data for communicating with and supervising the corresponding network adapter. The adapter driver instances are represented conceptually as separate entities in FIG. 4; however, depending on the hardware configuration, the executable code of the adapter drivers may actually be the same for some or all adapters, although state data will differ. In this case, the OS kernel may actually contain only a single copy of the code, and multiple copies of state data.

Connection manager 403 manages the various network connections on behalf of one or more applications executing on host system 201. Connection manager is likewise executable code and state data for performing various services relating to connection management, such as management of TCP/IP stacks, assembly of packets for outbound transmission, receiving of inbound packets and extraction of data therefrom, communication with higher-level applications, and so forth. Among the functions included in connection manager 403 is an adapter activation function 404 which responds to detection of an activated adapter 207 to automatically configure an IP address for the adapter, a host DHCPREQUEST handling function 405 which handling a DHCPREQUEST received over a network by an adapter within the host, and an ARP request handling function 406 for handling an ARP request received over a network by an adapter within the host, and an adapter deactivation function 407 which responds to deactivation of an adapter, the operation of which are explained in greater detail herein. Connection manager further includes various conventional functions as are known for handling network connection protocols. Connection manager maintains various state data including network object structure 408. Network object structure represents a state of various network connections, as explained further herein.

In the exemplary embodiment of FIG. 4, connection manager 403 is represented as an entity separate from operating system 401. However, it will be understood that some or all of the functions of a network connection manager could be integrated into operating system kernel 401, and/or that an operating system may contain multiple components at different levels of proximity to the hardware.

System 200 further contains one or more user applications or high-level applications 411-413 (of which three are represented in FIG. 4, it being understood that the actual number may vary, and is typically much larger). User applications generate, maintain and/or use user data, conceptually represented as three user data entities 414-416 (it being understood that the actual number may vary, and is typically much larger). Data entities 414-416 may represent data in any form, including flat files, tables, arrays, relational databases, etc. User applications 411-413 communicate with remote processes over networks 202 and/or the Internet to perform productive work on behalf of users. User applications 411-413 do not directly perform network communications tasks, but invoke appropriate network communications functions in connection manager 403 for managing network communications. User applications may include those usually associated with client functions (such as web browsers, e-mail, etc.) or may include applications usually associated with server functions (such as search engines, large database management, etc.), and the functions of client and server may reside together on the same host system.

It will be understood that a typical host system will contain many other software components (not shown), which are not essential to an understanding of the present invention. In particular, a typical operating system will contain numerous functions and state data unrelated to the transmission of data across a network.

Various software entities are represented in FIG. 4 as being separate entities or contained within other entities. However, it will be understood that this representation is for illustrative purposes only, and that particular modules or data entities could be separate entities, or part of a common module or package of modules. Furthermore, although a certain number and type of software entities are shown in the conceptual representations of FIG. 4, it will be understood that the actual number of such entities may vary, and in particular, that in a complex host system environment, the number and complexity of such entities is typically much larger.

While the software components of FIG. 4 are shown conceptually as residing in memory 302, it will be understood that in general the memory of a computer system will be too small to hold all programs and data simultaneously, and that information is typically stored in data storage devices 325-327, comprising one or more mass storage devices such as rotating magnetic disk drives, and that the information is paged into memory by the operating system as required. Furthermore, it will be understood that the conceptual representation of FIG. 4 is not meant to imply any particular memory organizational model, and that host system 201 might employ a single address space virtual memory, or might employ multiple virtual address spaces which overlap.

Figure 5:
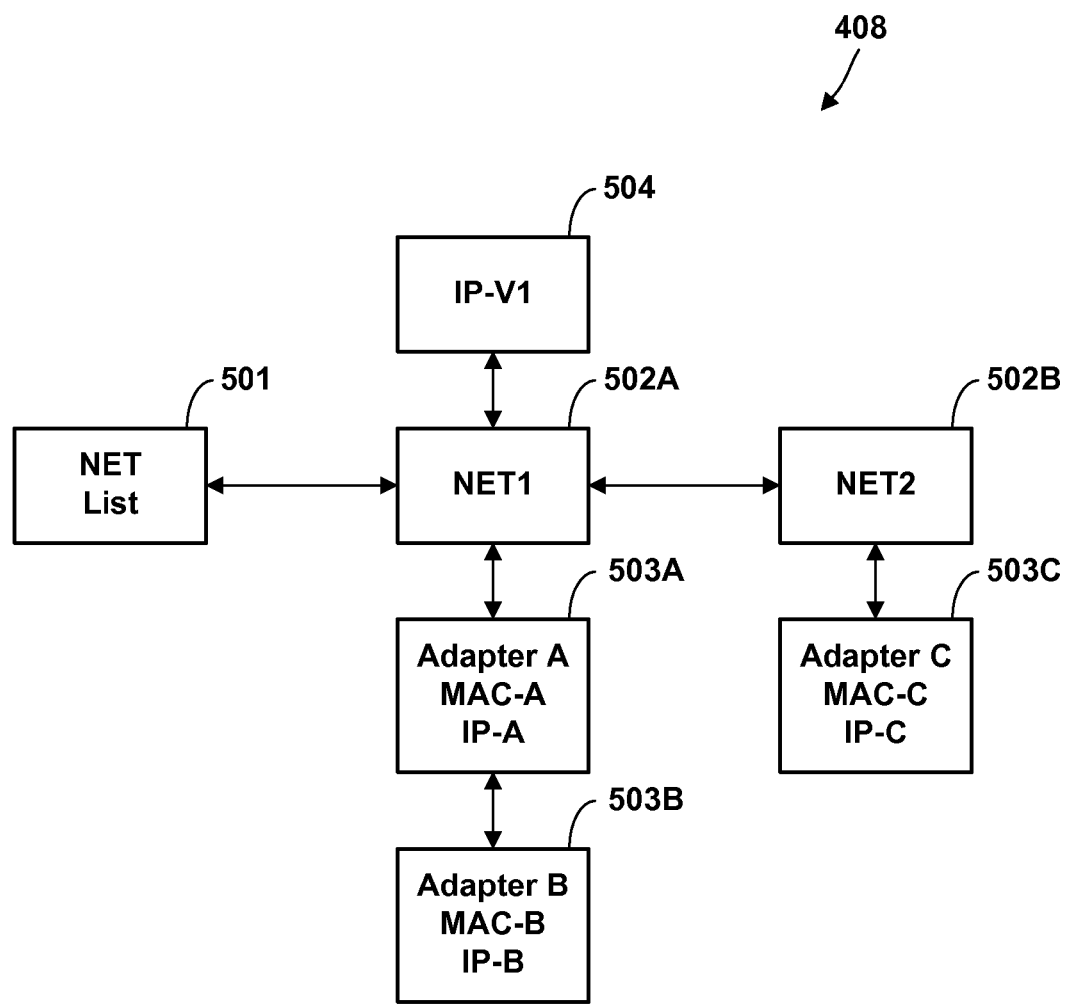
FIG. 5 is a conceptual representation of an exemplary network object structure for internally representing the state of a network configuration, according to the preferred embodiment.

FIG. 5 is a conceptual representation of an exemplary network object structure 408 for internally representing the state of a network configuration as shown in FIG. 2, according to the preferred embodiment. Network object structure 408 comprises a NET list object 501, which is the root of a list of networks available to host system 201. The root NET list object references the list of network objects 502A, 502B (generically referred to herein as feature 502), each network object representing a corresponding network available to host system 201. Specifically, root NET object 501 references NET1 object 502A for representing network "Net1" 202A, which in turn references NET2 object 502B for representing network "Net2" 202B. Additional networks, if present, are similarly represented by extending the list, i.e., referencing another network object from NET2 object 502B, and so on.

Each network object 502 in turn references a list of adapter objects 503A-C (herein generically referred to as feature 503), each adapter object 503A-C representing a corresponding adapter 207A-C which is coupled to the corresponding network. Thus, network object 502A representing Net1 202A references adapter object 503A representing adapter 207A, which is coupled to network Net1. Adapter object 503A in turn references adapter object 503B representing adapter 207B, also coupled to network Net1. If there were additional adapters coupled to the same network, they would be represented by extending the list of adapters from adapter object 503B. Network object 502B references adapter object 503C representing adapter 207C, the only adapter in host 201 coupled to network Net2 202B. In addition to any other useful state information, each adapter object 503 records the Media Access Control (MAC) address of the corresponding adapter and its assigned IP address. The MAC address is a unique hardware number assigned to a device at the time of manufacture, and is used by certain LAN protocols at a low level to uniquely specify a device.

If a virtual IP address is assigned to any network connection, then a corresponding virtual IP address object 504 is referenced by the corresponding network object. FIG. 5 represents a single virtual IP address object 504 referenced by network object 502B representing network Net1. The virtual IP address object contains a virtual IP address assigned to the network to which it is linked. This virtual IP address could be used by either of Adapter 207A or Adapter 207B. Since only one adapter should use the virtual IP address at any one time, the adapter (in this case, Adapter 207A) represented by an adapter object 503A at the head of the list is considered the primary adapter and handles all communications addressed to the virtual address. The remaining adapter or adapters function as backups. Outbound packets may be load balanced across primary and backup adapters, however, inbound packets typically only arrive on the primary adapter, since only the primary adapter responds to and advertises ARP packets on behalf of the virtual IP address. In the preferred embodiment, a single virtual address is automatically assigned to any network having multiple adapters connected to it. However, it will be understood that there could be multiple virtual addresses assigned to a network connection, and that each virtual address could have a different primary adapter or multiple virtual addresses could share a primary adapter, and that some of these could be assigned manually, or that an automatic configuring means could be programmed to assign multiple virtual addresses.

In accordance with the preferred embodiment of the present invention, a host node detects the fact that multiple adapters within the host are connected to the same network as part of a configuration process for one of the adapters, in which it broadcasts a request for an IP address for a first adapter, and listens to the broadcast on the second. In this situation, the host automatically assigns a virtual IP address to the multiple adapters coupled to the same network The host can further detect a change in configuration causing one adapter to be coupled to a different network, and assign a virtual IP address to the new network connection as appropriate. This process makes it possible to automatically configure a host node to have a virtual IP address with no or minimal manual intervention.

Figure 6:
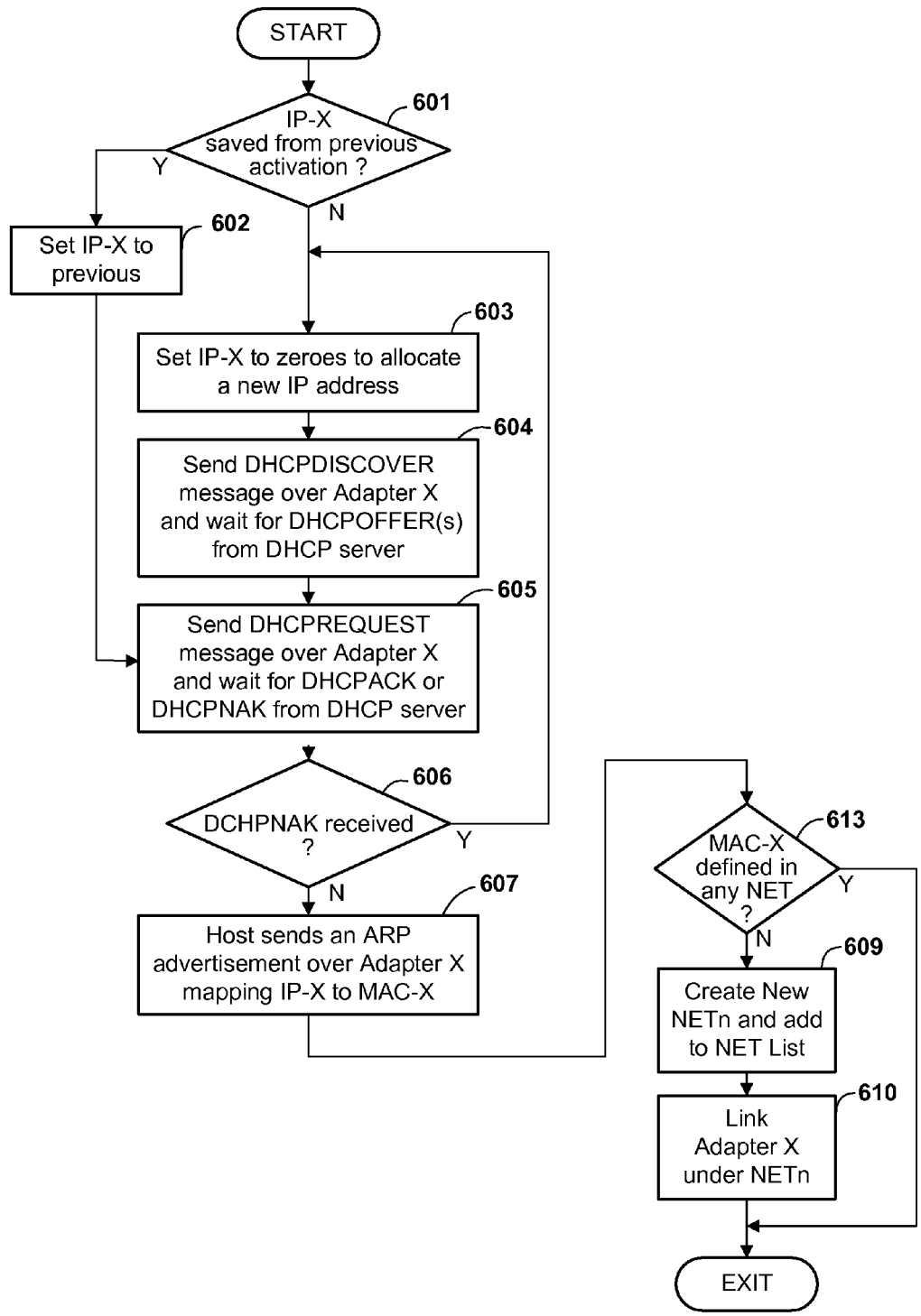
FIG. 6 is a high-level flow diagram of the process of configuring an adapter, according to the preferred embodiment.

In the preferred embodiment, an configuration process performed by adapter activation function 404 is triggered whenever an adapter is activated. Detection of adapter activation is preferably accomplished automatically, using any of various techniques commonly known as "plug and play", or any other technique now known or hereafter developed for automatic detection of adapter activation. Preferably, host 201 (in which the adapter being activated is located) invokes the services of another network device (also a host) acting as a DHCP server 203 in accordance with the established protocol known as DHCP. It should be understood, however, that the present invention is not limited to a DHCP based implementation. FIG. 6 is a high-level flow diagram of the process of configuring an adapter (designated adapter X) performed by adapter activation function 404, according to the preferred embodiment.

Referring to FIG. 6, adapter activation function 404 determines whether an IP address for adapter X (designated IP-X) was saved from a previous activation (step 601). If so, it is desirable to re-use the previous IP address, and therefore the 'Y' branch is taken from step 601, and IP-X is initialized to the previously saved value (step 602). The host will then attempt to obtain the IP address again by issuing a DHCPREQUEST message over the adapter (step 605).

If no previous IP address was saved (the 'N' branch from step 601), then IP-X is initialized to all zeroes to allocate a new IP address (step 603). The host then issues a DHCPDISCOVER message over adapter X, and waits for a DHCPOFFER response from a DHCP server (step 604). The DHCPOFFER will contain a new IP address. The host should receive one or more DHCPOFFER responses, and selects one of the offers using any suitable criteria Whether a previous IP address was saved or not, the host then sends a DHCPREQUEST message from adapter X over the network, the DHCPREQUEST message containing the previously saved or new IP address (step 605). The host then waits for a response from the DHCP server in the form of either a DHCPACK (acknowledge) or DHCPNAK (no acknowledge)

If a DHCPNAK is received (the 'Y' branch from step 606), then the DHCP server has rejected the IP address, and the host returns to step 603 to attempt to obtain another IP address. This could happen, for example, because a previously saved IP address is no longer available. If a DHCPACK is received, the 'N' branch is taken from step 606. The host then send an ARP advertisement from adapter X over the network (step 607). The ARP advertisement informs all hosts on the network that the IP address (IP-X) has been assigned to adapter X, which is identified by its MAC address (MAC-X). I.e., the ARP advertisement contains IP-X and MAC-X. This mapping information is saved in DHCP server 203, and depending on the network implementation, other devices on the network may cache this information as well.

After sending the ARP advertisement, the adapter activation function 404 examines the network object structure 408 to determine whether the adapter being activated (adapter X) has been configured in the network object structure, i.e. whether MAC-X is defined in any network object 502 in the network object structure (step 608). Although recently activated, it is possible that MAC-X is already defined because host 201 contains multiple adapters on the same network, as explained herein with respect to FIG. 7. If MAC-X is not defined in a network object, then adapter X is apparently the only adapter within host 201 which is coupled to the network to which it is attached. In this case, the 'N' branch is taken from step 608, a new network object (NETn) is created to represent the network to which adapter X is coupled, and object NETn is added to the list of network objects in network object structure 408 (step 609). Adapter X is then linked under NETn by creating or linking an adapter object 203 representing adapter X to the network object NETn (step 610). If, at step 608, MAC-X was already defined in a NET object, then the 'Y' branch is taken from step 608, and steps 609 and 610 are by-passed. Activation and configuration of adapter X are then complete.

In the preferred embodiment, the connection manager detects the presence of multiple adapters coupled to the same network, links multiple adapter objects representing the multiple adapters to a common network object in the network object structure 408, and causes a virtual IP address to be generated for the network connection serviced by multiple adapters. This process is performed by DHCPREQUEST handling function 405 for handling a DHCPREQUEST received by host 201, as shown in FIG. 7.

Figure 7:
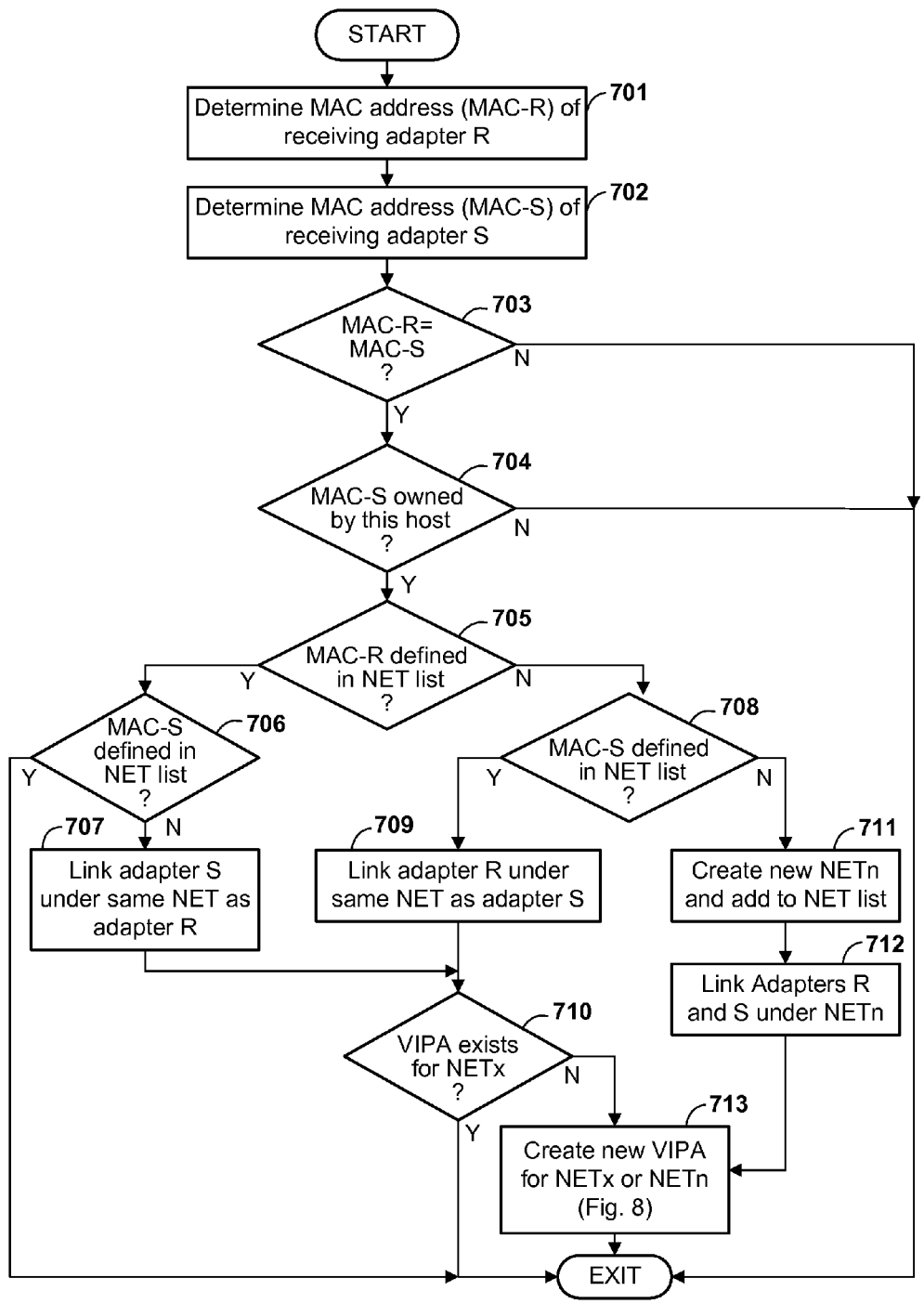
FIG. 7 is a high-level flow diagram of the process of handling a DHCPREQUEST received in an adapter coupled to a network, according to the preferred embodiment.

FIG. 7 is a high-level flow diagram of the process of handling a DHCPREQUEST received in an adapter coupled to a network, as performed by DHCPREQUEST handler 405, according to the preferred embodiment. This process executes asynchronously with the adapter activation process described above with respect to FIG. 6, and is triggered when an adapter within host 201 coupled to a network receives a DHCPREQUEST. It will be understood that each adapter within host 201 which receives a DHCPREQUEST triggers a separate instance of the DHCPREQUEST handler, and therefore if multiple adapters are connected to the same network, it is possible that multiple instances of the DHCPREQUEST handler will be triggered responsive to a single DHCPREQUEST.

Referring to FIG. 7. the MAC address of the receiving adapter (MAC-R) and the MAC address of the sending adapter (MAC-S) are determined (step 701). The MAC address of the receiver should be available in host state data; the MAC address of the sender is contained in the DHCPREQUEST.

If the two MAC addresses are the same (MAC-S=MAC-R), then the adapter is receiving its own echoed DHCPREQUEST. There is nothing to do in this case, so the 'Y' branch is taken from step 702, and no further processing takes place. It is not necessarily possible for an adapter to receive its own DHCPREQUEST in all network protocols, and in those protocols which make it impossible, the check performed at step 702 may be omitted.

Assuming MAC-S and MAC-R are different, then the handler determines whether MAC-S is owned by host 201, i.e., whether MAC-S is the MAC address of an adapter within host 201 (step 704). This may be determined by any conventional means for referencing machine state data. If not, the 'N' branch is taken from step 704, and nothing further is done to process the DHCPREQUEST. If MAC-S is owned by host 201, then it is known that both MAC-R and MAC-S are owned by host 201 and are coupled to a common network. In this case, the 'Y' branch is taken from step 704, and processing continues at step 705.

The network object structure 408 is then accessed to determine whether adapter MAC-R has been defined in the network object structure, i.e., whether an adapter object 503 representing adapter MAC-R is linked to any network object 502 in the network object structure (step 705). If so, the 'Y' branch is taken to step 706, and it is determined whether MAC-S is defined in the network object structure. If MAC-S is also defined, then no further action is necessary, and the 'Y' branch is taken from step 706. (This may be the case, e.g. where MAC-S and MAC-R were previously defined, and MAC-S is requesting another IP address.) If, at step 706, MAC-S is not defined, then the 'N' branch is taken from step 706. Since it is known that MAC-S is on the same network as MAC-R, Adapter MAC-S is then linked the common network in the network object structure 408 by creating or linking an adapter object representing adapter MAC-S to the network object to which adapter MAC-R is linked (step 707). Processing continues at step 710.

If, at step 705, MAC-R was not defined in the network object structure, the 'N' branch is taken from step 705. If MAC-S is defined in the network object structure, the 'Y' branch is taken from step 708, and adapter MAC-R is then linked the common network in the network object structure 408 by creating or linking an adapter object representing adapter MAC-R to the network object to which adapter MAC-S is linked (step 709). Processing continues at step 710.

At step 710, the DHCPREQUEST handler determines whether a virtual IP address (VIPA) already exists for the common network by examining the network object structure to find a virtual IP address object linked to the network object shared by adapters MAC-S and MAC-R. If such a virtual address already exists, the 'Y' branch is taken from step 710, and no further action is performed. If no such virtual address exists, the 'N' branch is taken from step 710, and a new virtual IP address is generated for this network. Generation of the new virtual IP address is represented in FIG. 7 as step 713, and is shown in greater detail in FIG. 8.

If, at step 708, it was determined that MAC-S is not defined in the network object structure, then neither MAC-S nor MAC-R is defined, and the 'N' branch is taken from step 708. This may be the case, e.g., in an initialization situation. In this case, a new network object (NETn) is created to represent the network to which adapters MAC-R and MAC-S are coupled, and object NETn is added to the list of network objects in network object structure 408 (step 711). Adapters MAC-R and MAC-S are then linked under NETn by creating or linking adapter objects representing the two adapters to the network object NETn (step 712). Since both adapters are coupled to the same network, a virtual IP address is then generated for network NETn.

It is expected that under the DHCP protocol, a sufficient time will have elapsed so that by the time the adapter activation process receives the DHCPACK and transmits an ARP advertisement (steps 606 and 607 of FIG. 6), the asynchronously executing DHCPREQUEST handler will have created a network object and/or linked adapters to a network object if multiple adapters are coupled to a common network (steps 701-712 of FIG. 7). However, if this can not be guaranteed, it would be possible to insert a semaphore or other wait device between steps 607 an 608, to force the adapter activation process to wait until any DHCPREQUEST handling process executing in host 201 will have completed the creation of any necessary network object 502 and linking of adapter object(s) 503 to a common network object. In this case, it would not be necessary to wait until the virtual IP address is assigned at step 713.

In the above description and in FIG. 7, it is assumed for the sake of clarity that host 201 is not itself a DHCP server, and therefore the received DHCP request is used solely for the purpose of detecting the presence of two or more adapters on the same network. If host 201 is also acting as a DHCP server for the network, then it would, in addition to those steps shown in FIG. 7, process the DHCP request to generate an appropriate response (DHCPNAK or DHCPACK) in the manner required by the DHCP protocol.

If the DHCPREQUEST handler determines to create a virtual IP address for a network (designated NETx), it follows the DHCP protocol to assign a new virtual address to one of the adapters. This procedure is analogous to certain steps of FIG. 6, and is shown in FIG. 8.

Figure 8:
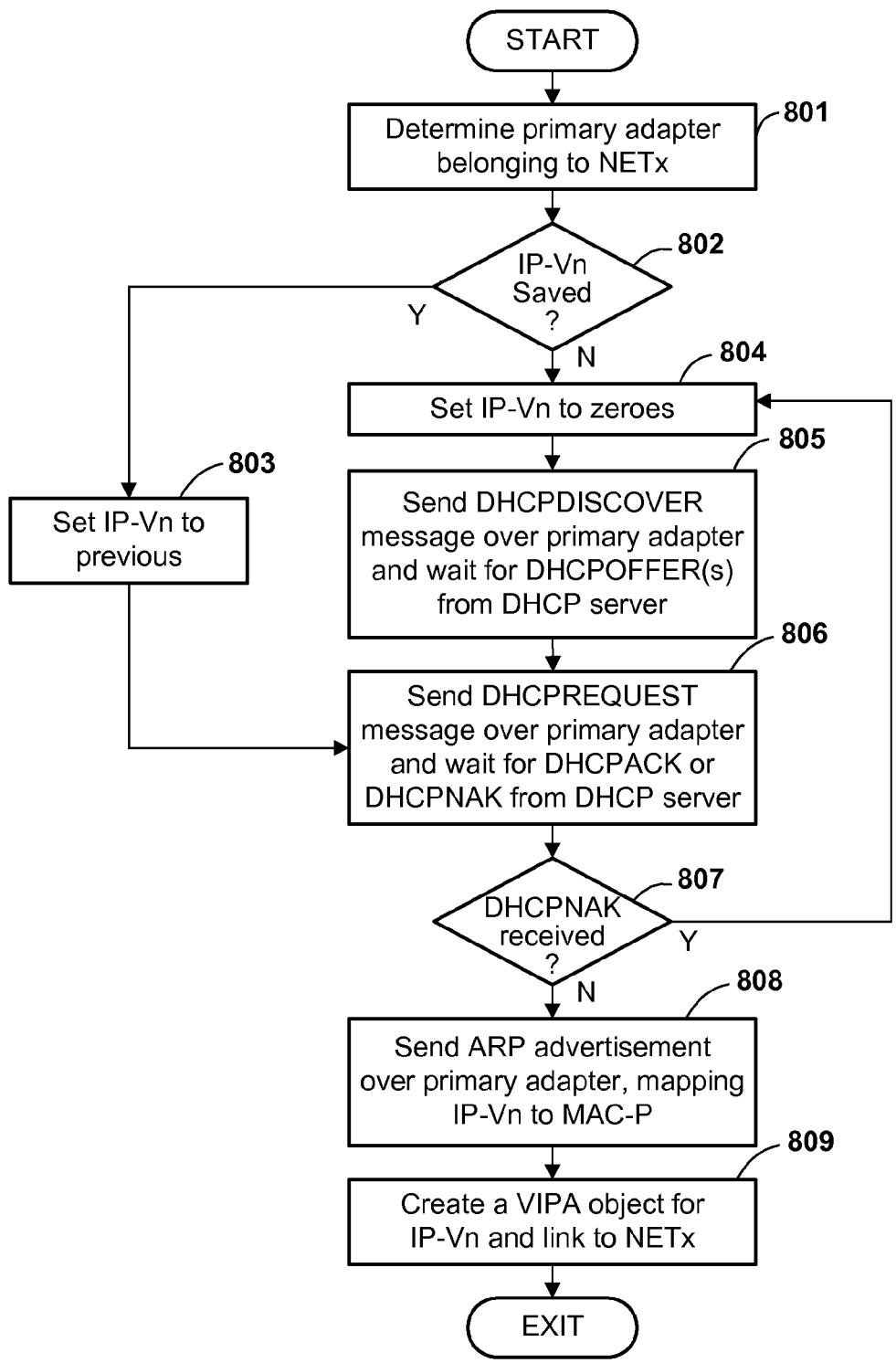
FIG. 8 is a high-level flow diagram of a process of creating and assigning a virtual IP address, according to the preferred embodiment.

Referring to FIG. 8, an adapter (designated adapter X) coupled to network X is selected as the primary adapter for servicing the virtual IP address (step 801). In the preferred embodiment, the primary adapter is the adapter at the head of the list of adapters in the network object structure, i.e., represented by the first adapter object 503 linked to the network object 502. However, other criteria could alternatively be used for selecting the primary adapter.

If a virtual address(designated IP-Vn) was saved from a previous activation, the 'Y' branch is taken from step 802, and IP-Vn is initialized to the previously saved value (step 803). The host will then attempt to obtain IP-Vn again by issuing a DHCPREQUEST message over the primary adapter (step 806).

If no previous virtual IP address was saved (the 'N' branch from step 802), then IP-Vn is initialized to all zeroes to allocate a new IP address (step 804). The host then issues a DHCPDISCOVER message over the primary adapter, and waits for a DHCPOFFER response from a DHCP server (step 805). The DHCPOFFER will contain a new IP address, which can be used as a virtual IP address. The host should receive one or more DHCPOFFER responses, and selects one of the offers using any suitable criteria Whether a previous IP address was saved or not, the host then sends a DHCPREQUEST message from the primary adapter over the network, the DHCPREQUEST message containing the previously saved or new IP-Vn (step 806). The host then waits for a response from the DHCP server in the form of either a DHCPACK (acknowledge) or DCHPNAK (no acknowledge).

If a DHCPNAK is received (the 'Y' branch from step 807), then the DHCP server has rejected the IP address, and the host returns to step 803 to attempt to obtain another IP address. If a DHCPACK is received, the 'N' branch is taken from step 807. The host then send an ARP advertisement from the primary adapter over the network (step 808). The ARP advertisement informs all hosts on the network that IP-Vn has been assigned to the primary adapter, which is identified by its MAC address (MAC-p). This mapping information is saved in DHCP server 203, and depending on the network implementation, other devices on the network may cache this information as well.

A virtual IP address object 504 is then created to represent virtual address IP-VN in the network object structure 408, and this virtual IP address object is linked to the network object 502 representing NETx (step 809). Assignment and configuration of the virtual IP address are then complete.

Figure 9:
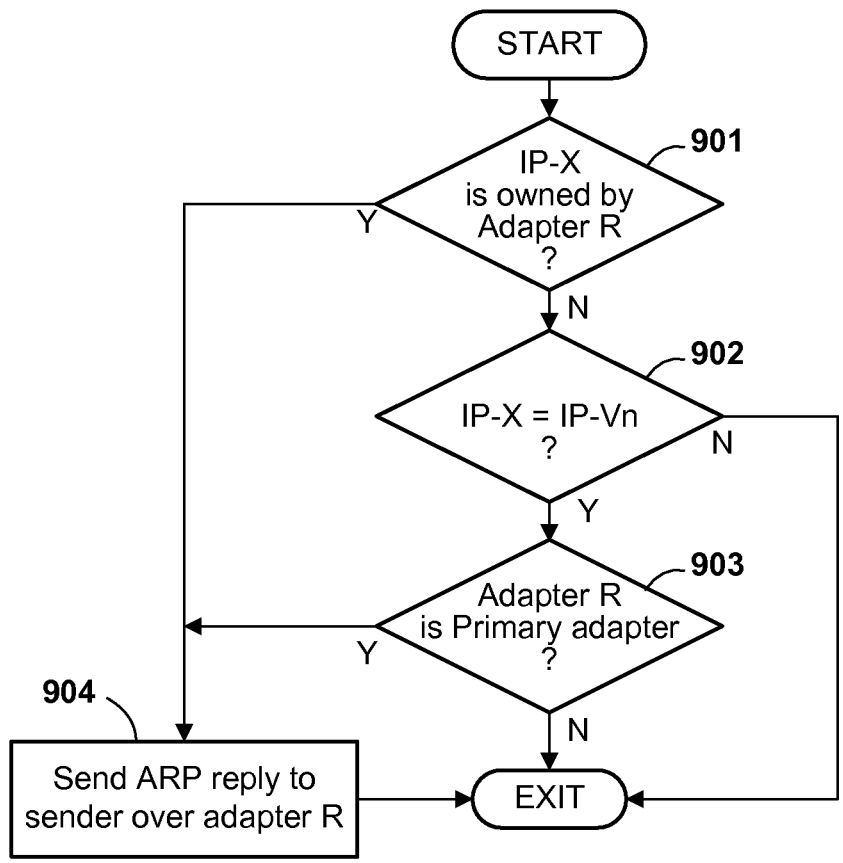
FIG. 9 is a high-level flow diagram showing a process of responding to an ARP request received in a host adapter, according to the preferred embodiment.

If host 201 receives an ARP request from another network device (i.e., a request that the owner of a particular IP address identify itself), the host must respond if the address is owned by it, either as an IP address assigned to a specific adapter within the host, or a virtual address which can assigned to any of multiple adapters. If it is a virtual address, the host will provide the identity (i.e. MAC address) of the primary adapter. The process of handling an ARP request received in an adapter R, performed by ARP request handler 406, is shown in FIG. 9. It will be understood that each adapter which receives an ARP request will trigger a separate instance of the ARP request handling process shown in FIG. 9, and that at most one of these should respond.

Referring to FIG. 9, upon receipt of an ARP request in adapter R, the ARP request handler determines whether the IP address contained in the request (IP-X) is owned by adapter R (step 901). This can be determined by examining the adapter object 503 for adapter R. If so, the 'Y' branch is taken from step 901, and an appropriate ARP reply is transmitted to the requester (sender of the ARP request) from adapter R (step 904). The ARP reply contains the MAC address of adapter R. If IP-X is not owned by adapter R, the 'N' branch is taken from step 901, and the ARP request handler determines whether IP-X is a virtual IP address (step 902). This can be determined to examining the virtual IP address object(s) 504 in the network object structure. If IP-X is not a virtual IP address, the 'N' branch is taken from step 902, and no further action is required. If IP-X is a virtual address, the ARP handler then determines whether adapter R is the primary adapter assigned to the virtual address (step 903). The primary adapter can be determined by examining the network object structure 408 to determine the adapter immediately linked to the network object (at the head of the list of adapters coupled to the network). If adapter R is the primary adapter, the 'Y' branch is taken from step 904, and an ARP reply is transmitted to the requester from adapter R (step 904). If R is not the primary adapter, the 'N' branch is taken from step 903, and no further action is taken. Thus in the case of a virtual IP address, one and only one adapter (the primary adapter) will respond with an ARP reply.

When an ARP requester (a host or other device on the network which issued an ARP request) receives a reply to the ARP request, it typically updates an ARP cache to associate the IP address which was the subject of the request with the MAC address which was returned in the reply to the request. The ARP requester thereafter associates the IP address with the MAC address provided in response to the request. The ARP requester does not, and need not, know whether an IP address is a virtual IP address or is fixed to a particular adapter. It merely knows that there is an adapter that will respond to that IP address.

Similarly, when a host or other device on the network receives an ARP advertisement, it will typically update its ARP cache to associate the IP address with the MAC address, both of which are contained in the ARP advertisement. The device receiving the ARP advertisement does not, and need not, know whether the IP address is virtual or not.

Figure 10:
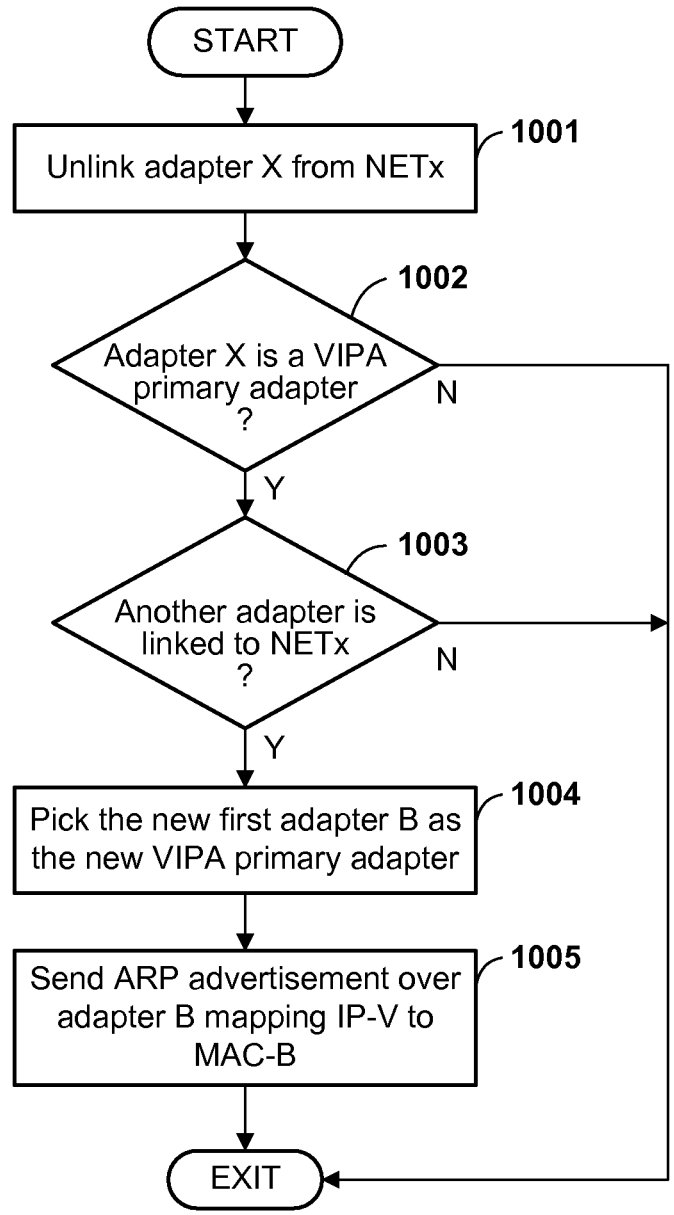
FIG. 10 is a high-level flow diagram showing a process of handling deactivation of an adapter, according to the preferred embodiment.

In the preferred embodiment, an adapter deactivation function 407 in connection manager 403 is triggered when an adapter is deactivated. Adapter deactivation may be caused by physically unplugging an adapter, by internal failure of an adapter, by failure of a connection, by deactivation under command of a system administrator or similar person, etc. Any appropriate means for detecting adapter deactivation, now known or hereafter developed, may be used to trigger the adapter deactivation function. Among other things, the adapter deactivation function attempts to assign any virtual address to another adapter, if there is one. FIG. 10 shows the process of handling adapter deactivation.

Referring to FIG. 10, upon detection that an adapter (adapter X) has been deactivated, the adapter object 503 representing adapter X in network object structure 408 is unlinked from its corresponding network object 502 (step 1001). This adapter object could either be deallocated entirely, or could be simply unlinked and placed in a list or pool of deactivated adapters.

The adapter deactivation function determines whether adapter X is the primary adapter for a virtual IP address (step 1002). Adapter X will be the primary adapter for a virtual address if it is at the head of a list of adapters for a network having a virtual address. It will be appreciated that the status of primary adapter could alternatively be recorded in the adapter object for adapter X. Note that it may be necessary to make this determination in whole or in part before unlinking adapter X from the network object. If adapter X is not the primary adapter for a virtual IP address, the 'N' branch from step 1002 is taken, and no further action is required.

If adapter X is the primary adapter for a virtual address, the 'Y' branch is taken from step 1002. In this case a determination is made whether there is another active adapter on the same network (step 1003). If not, the 'N' branch is taken from step 1003, and no further action is required. If there is another adapter, the 'Y' branch is taken from step 1003. The first adapter on the list of adapters coupled to the network (adapter B) is then chosen as the new primary adapter (step 1004). Host 201 then sends an ARP advertisement over the new primary adapter (adapter B), mapping the virtual IP address to the MAC address of adapter B (MAC-B). Other devices on the network thereafter treat adapter B as the adapter to which the virtual IP address is assigned, and host 201 treats it as the primary adapter for the virtual IP address.

Thus, once a virtual IP address is assigned and configured, the primary adapter responds to it exactly the same as it would for any other IP address assigned to that adapter. The only difference is that, in the case of a virtual IP address, the host has the capability to automatically substitute a different adapter, and inform other network devices of that substitution by means of an ARP advertisement, in the event that the primary adapter becomes inactive. This capability is entirely seamless to the user.

Furthermore, the connection manager responds automatically to changes in configuration to re-assign virtual IP addresses, and even assign new virtual IP addresses, as needed. For example, if, in the exemplary configuration of FIG. 2, adapter 207A were to be unplugged from network 202A and coupled to network 202B, then host 201 would take the following steps. First, it would unlink adapter object 503A (representing adapter 207A) from network object 502A and assign the virtual address to adapter 207B, using the process of FIG. 10. Then, when adapter 207A is plugged into network 202B, an IP address (which could be the same IP address) would be obtained for adapter 207A in network 202B, using the process of FIG. 6. The sending of a DHCPREQUEST message at step 605 would cause adapter 207C to receive it, thus triggering the process of FIGS. 7 and 8, causing adapter object 504 to be linked to network object 503B (representing network 202B) and a virtual IP address to be created for network 202B. This new virtual address would be assigned to one of adapters 207A or 207C as the primary adapter.

It will be understood that the flow diagrams represented in FIGS. 6-10 are simplified flow diagrams intended to illustrate the significant action performed to support virtual IP address configuration, and that certain features are not necessarily shown. For example, network communications protocols typically define circumstances of timeout, error recovery, and so forth which have been eliminated from the flow diagrams for clarity. Furthermore, it will be understood that disclosed herein is a preferred embodiment of a technique for automatically configuring virtual IP addresses, and that many variations in addition to those specifically discussed herein are possible in the method steps shown in FIGS. 6-10 and described above. Specifically, it will be recognized that the order of performing certain steps may be changed, that some steps may be optional or may be performed in a different manner from that described herein, that some steps may be combined, and so forth. In particular, certain steps shown are for maintaining the network object structure 408. It will be understood that network configuration state data could be maintained in a different form from that shown in the network object structure of the preferred embodiment, and that in this case some of the steps may be modified accordingly.

In the preferred embodiment, a local network contains at least one DHCP server operating in accordance with the defined DHCP protocol, and the host detects a DHCPREQUEST received under the DHCP protocol in a different adapter to trigger a virtual IP address assignment. However, the local network need not use a DHCP server, and any suitable alternative whereby some form of message issued by one adapter is detected by another adapter on the same network could be used as a basis for automatic configuration of a virtual IP address. For example, a local network may use some other form of autoconfiguration of IP addresses, such as configuration in accordance with the "IPv6 Stateless Address Autoconfiguration" draft standard Internet Society protocol, described in RFC 2462, by S. Thomson & T. Narten, December 1998. A further refinement of this protocol for use in automatic configuration of Internet communications is described in U.S. Patent Publication 2004/0083306 A1, published Apr. 29, 2004, entitled "Method and Apparatus for Maintaining Internet Domain Name Data", which is herein incorporated by reference. Any equivalent procedure or any subsequent modification or revision of this draft standard protocol may alternatively be used.

In general, the routines executed to implement the illustrated embodiments of the invention, whether implemented as part of an operating system or a specific application, program, object, module or sequence of instructions are referred to herein as "computer programs". The computer programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product on computer-readable media in a variety of forms, and the invention applies equally regardless of the particular type of computer-readable media used to actually carry out the distribution, and whether distribution is accomplished in whole or in part using electronic transmission of instruction data. Examples of suitable computer-readable media are illustrated in FIG. 3 as memory 302 and data storage devices 325-327.

Although a specific embodiment of the invention has been disclosed along with certain alternatives, it will be recognized by those skilled in the art that additional variations in form and detail may be made within the scope of the following claims.

What is claimed is:

1. A method of maintaining IP address configuration of a network connection, comprising the steps of:
   transmitting a request to obtain an IP address from a server, the request being transmitted from a first adapter in a host coupled to a network;
   receiving said request to obtain an IP address from a server in a second adapter in said host coupled to said network;
   responsive to receiving said request to obtain an IP address from a server in said second adapter, automatically determining that said first and second adapters are coupled to the same network;
   receiving, in said first adapter, an IP address from the server responsive to said request to obtain an IP address from a server; and
   responsive to automatically determining that said first and second adapters are coupled to the same network and receiving, in said first adapter, an IP address from the server, automatically assigning the IP address received from the server to at least one of said first and second adapters.

2. The method of claim 1, wherein said step of transmitting a request to obtain an IP address from a server comprises transmitting a DHCPREQUEST consistent with the Dynamic Host Configuration Protocol.

3. The method of claim 1, wherein said step of automatically assigning the IP address received from the server further comprises automatically configuring a virtual IP address associated with a network connection between said host and said network.

4. The method of claim 3, wherein said step of automatically assigning the IP address received from the server further comprises assigning one of said first adapter and said second adapter as a primary adapter for said virtual IP address.

5. The method of claim 1, wherein said step of automatically assigning the IP address received from the server further comprises transmitting an ARP advertisement to at least one other device coupled to said network, said ARP advertisement associating said virtual IP address with a MAC address of said primary adapter.

6. A computer program product for maintaining a network connection, comprising:
   a plurality of processor-executable instructions recorded on a non-transitory computer-readable media, wherein said instructions, when executed by at least one processor of at least one digital data device coupled to a network, cause the device to perform the steps of:
   transmitting a request to obtain an IP address from a server, the request being transmitted from a first adapter in said digital data device over said network;
   receiving said request to obtain an IP address from a server in a second adapter in said digital data device coupled to said network;
   responsive to receiving said request to obtain an IP address from a server in said second adapter, determining that said first and second adapters are coupled to the same network;
   receiving, in said first adapter, an IP address from the server responsive to said request to obtain an IP address from a server; and
   responsive to determining that said first and second adapters are coupled to the same network and receiving, in said first adapter, an IP address from the server, assigning the IP address received from the server to at least one of said first and second adapters.

7. The computer program product of claim 6, wherein said step of assigning the IP address received from the server further comprises configuring a virtual IP address associated with a network connection between said digital data device and said network.

8. The computer program product of claim 6, wherein said step of assigning the IP address received from the server comprises configuring at least one IP address in accordance with a Dynamic Host Configuration Protocol.

* * * * *